United States Patent [19]

Boniface et al.

[11] 4,334,846
[45] Jun. 15, 1982

[54] APPARATUS FOR AUTOMATICALLY FEEDING BUSHINGS INTO A PRESS FOR MOULDING COVERS FOR STORAGE BATTERIES

[75] Inventors: Jean-Paul Boniface, Flamicourt; Gilbert Ponceblanc, Amiens, both of France

[73] Assignee: Societe Anonyme dite Compagnie Europeenne d'Accumulateurs, Paris, France

[21] Appl. No.: 247,129

[22] Filed: Mar. 24, 1981

[30] Foreign Application Priority Data

Mar. 27, 1980 [FR] France .............................. 80 06835

[51] Int. Cl.³ .............................................. B79C 6/00
[52] U.S. Cl. ................................................. 425/126 R
[58] Field of Search .................................... 425/126 R

[56] References Cited

U.S. PATENT DOCUMENTS

| | | | |
|---|---|---|---|
| 1,579,407 | 4/1926 | Smith | 425/126 R |
| 2,579,951 | 12/1951 | Morin | 18/30 |
| 3,112,521 | 12/1963 | Ward | 425/126 R |
| 3,135,993 | 6/1964 | Ryan | 425/126 R X |
| 3,303,256 | 2/1967 | Morin | 425/126 R X |
| 3,849,041 | 11/1974 | Knapp | 425/126 R X |

FOREIGN PATENT DOCUMENTS 1395824 3/1965 France .
2314035 1/1977 France .
980617 1/1965 United Kingdom .

*Primary Examiner*—J. Howard Flint, Jr.
*Attorney, Agent, or Firm*—Kenyon & Kenyon

[57] ABSTRACT

Apparatus for automatically feeding bushings into a press for moulding covers for storage batteries. It includes a pipe (1) for conveying the bushings (6), said pipe being divided into branches (8, 9, 10, 11) each of which communicates with a bore (28, 28') provided in a first moving part of the press (2), push rods being linked to the stationary part of the press (2), which push rods can each be inserted in one of said bores (28, 28') during the translation movement of said moving part, studs being provided on a second moving part of the press (2) and each being disposed adjacent to one of said bores so that firstly, before moulding when the press is closed by the translation movement of the two moving parts such that they abut against the stationary part of the press (2), the push rods push a bushing (6) into each bore (28, 28') until the bushing mates with the stud and secondly, after moulding when the press (2) is opened, another bushing (6) drops by gravity into the bore at the end of said push rod.

The invention is used in connection with the containers and covers of storage batteries.

5 Claims, 4 Drawing Figures

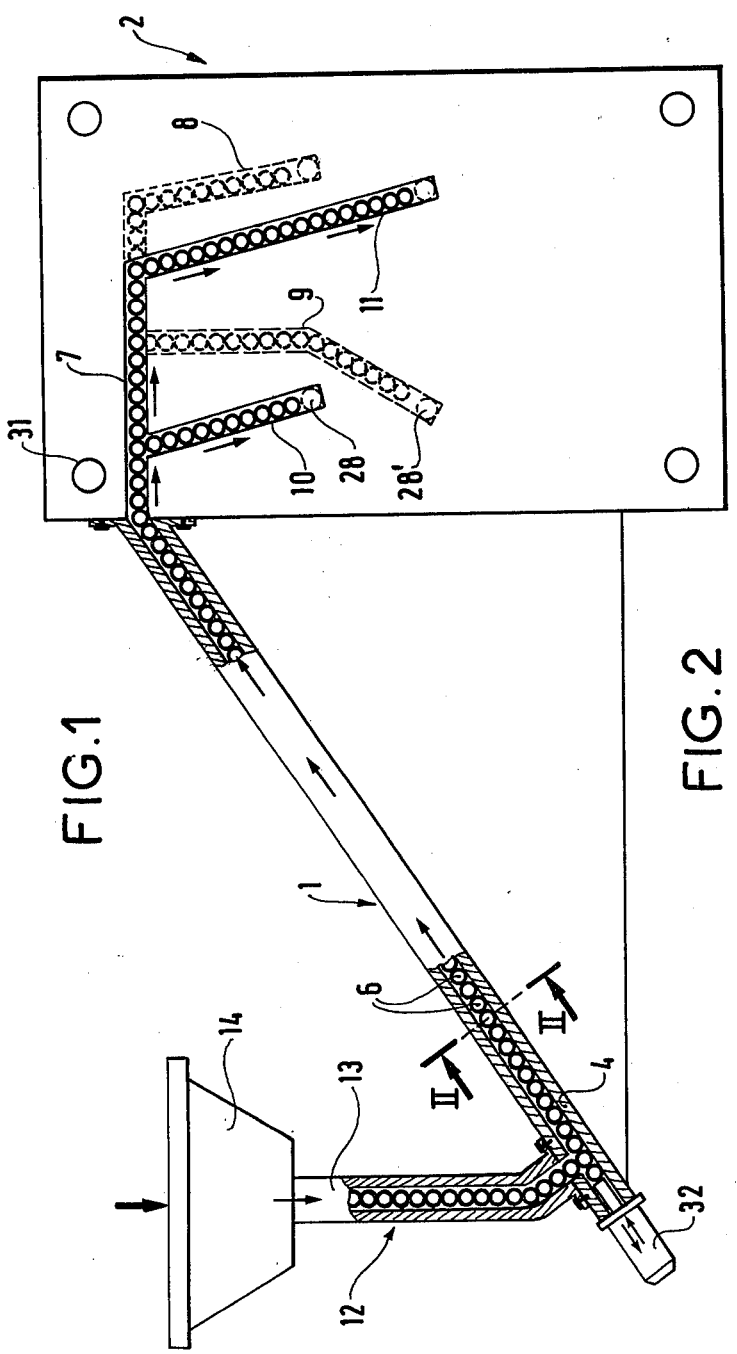

APPARATUS FOR AUTOMATICALLY FEEDING BUSHINGS INTO A PRESS FOR MOULDING COVERS FOR STORAGE BATTERIES

The present invention relates to apparatus to enable presses for moulding storage battery covers to be automatically fed with lead bushings.

BACKGROUND OF THE INVENTION

It is known that storage battery covers include lead parts, herein called bushings, which are designed as outlets for the terminals and which are inserted in a cover made of a plastics substance such as polypropylene, polystyrene or the like.

Therefore, when manufacturing said covers, it is necessary to insert such parts in a pressing mould in which the plastics substance is cast and pressed.

At present these bushings are inserted and positioned in the mould either manually or mechanically (in which case a moving loader is used) during the opening of the press.

However, such operational processes have drawbacks.

Of course, the manual process requires a full-time operator to be employed and also causes loss of time due to the stoppage of the press in the open position, due to the time required to position the bushings in the mould and due to the opening and closing of a security curtain.

Further, the production rate of such an operational method depends, of course, on the skill of the operator who, despite the safety systems installed, runs the risk of beng injured each time he places his hand in the mould.

In the mechanical process, loss of time is due to the stoppage of the press in the open position during the operation of the moving loader which positions the bushings. Further, in the case of erroneous operation, there is a danger that said loader will remain in position when the press is closed. This can cause serious damage to the equipment.

DESCRIPTION OF PREFERRED EMBODIMENTS

Preferred embodiments of the present invention remedy the drawbacks outlined hereinabove and provide apparatus which allows storage battery cover moulding presses to be fed automatically and safely with bushings without any loss of time, such apparatus also being very simple and reliable.

SUMMARY OF THE INVENTION

The invention therefore provides apparatus for automatically feeding bushings into a press for moulding covers for storage batteries wherein the apparatus includes a pipe for conveying the bushings, said pipe having at least one bushing-conveying compartment and being substantially horizontal inside the press, the or each of its compartments being subdivided into at least one descending branch each of which communicates with a bore provided in a first moving part of said press, push rods being linked to the stationary part of the press, which push rods can each be inserted in one of said bores during the translation movement of said moving part, studs being provided on a second moving part of the press and each being disposed adjacent to one of said bores so that firstly before moulding, when the press is closed by the translation movement of the two moving parts such that they abut against the stationary part of the press, the push rods push a bushing into each bore until the bushing mates with the stud, and secondly, after moulding when the press is opened, another bushing drops by gravity into the bore at the end of said push rod.

BRIEF DESCRIPTION OF THE DRAWINGS

An embodiment of the invention is described hereinbelow in greater detail with reference to the accompanying drawings in which:

FIG. 1 schematically illustrates an embodiment of apparatus in accordance with the invention.

FIG. 2 illustrates an axial cross-section along axis II—II of FIG. 1.

DESCRIPTION OF PREFERRED EMBODIMENTS

Figure 3:
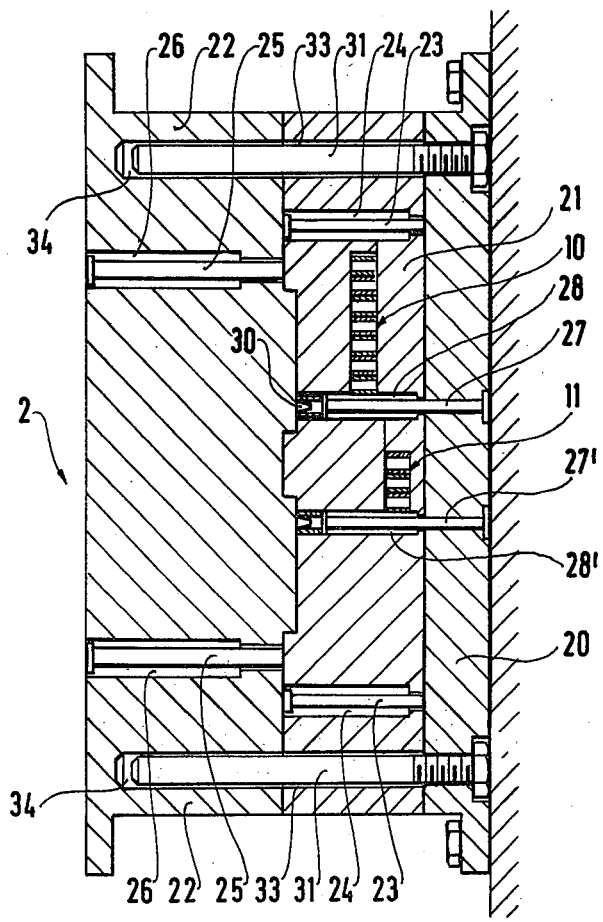
FIG. 3 and FIG. 4 illustrate how the apparatus in accordance with the invention is put into service in a moulding press for storage battery covers.

In FIGS. 1 and 2, lead bushings are conveyed by a pipe 1 towards a press 2. The pipe is divided into two compartments 3 and 4 for the negative bushings 5 and positive bushings 6 respectively. One such compartment may be a different size from the other. In the press 2, the pipe 1 has a substantially horizontal portion 7 which is subdivided into two descending branches for each of the compartments 3 and 4. Thus, compartment 3 is subdivided into two branches 8 and 9 while compartment 4 is divided into two branches 10 and 11.

Compartments 3 and 4 of the pipe 1 are fed with bushings via a pipe 12 whose passage 13 has two compartments which supply the compartments 3 and 4 by gravity with bushings stored in a hopper 14. Of course, other supply means can be envisaged e.g. a vibrating bowl, a jack, a conveyor belt or the like.

Lastly, a jack 32 pushes the bushings into their respective compartments.

Figure 4:
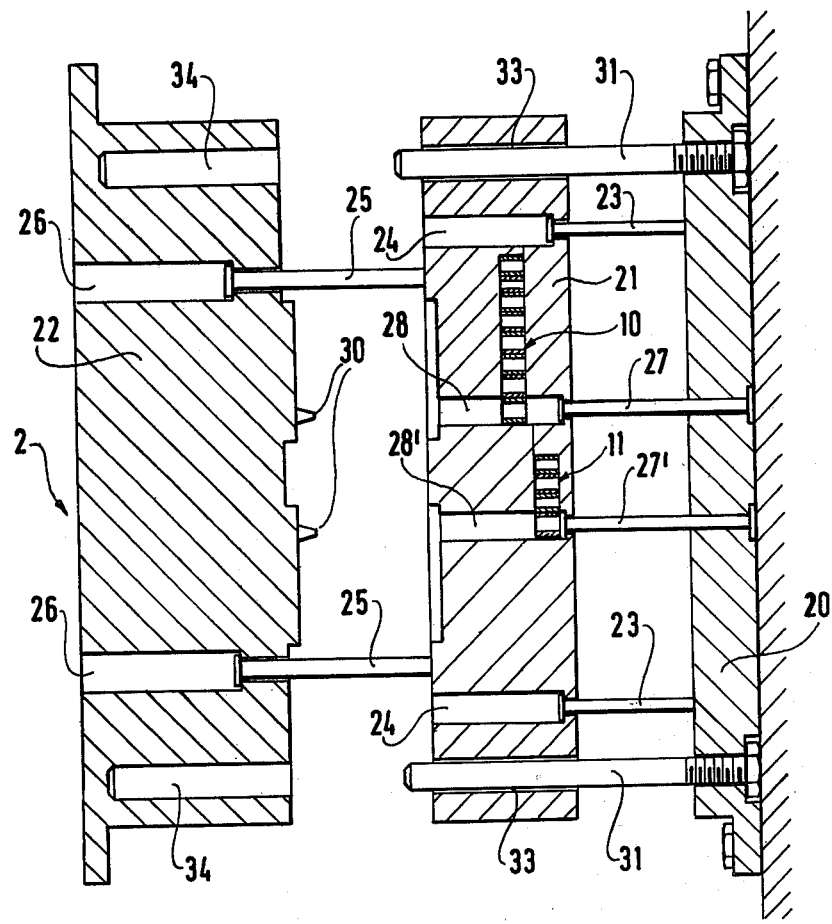

Referring now to FIGS. 3 and 4, it is seen that the moulding press has a stationary part 20 and two moving parts 21 and 22.

The stationary part 20 is integral with two travel-limiting rods 23 which are designed to engage in bores 24 in the moving part 21. Said moving part 21 itself has rods 25 which can slide in bores 26 provided in the moving part 22. Further, push rods such as 27 and 27' connected to the stationary part 20 can engage respectively in bores 28 and 28' in the moving part 21. The bore 28 communicates with the branch 10 of the pipe 1 while the bore 28' communicates with the branch 11 (FIG. 1). Of course, analogous dispositions, not illustrated in FIGS. 3 and 4, are provided for the branches 8 and 9. Lastly, the moving part 22 has studs such as 30 adjacent the bores 28, 28', etc.

The apparatus operates as follows:

Firstly, it will be observed that the compartments 3 and 4 of the pipe 1 as well as the passage 13 are permanently supplied with bushings that are in contact with one another.

Now, supposing that the press 2 is in the open position (FIG. 4), it is seen that in each bore 28 and 28', there is a bushing at the ends of the push rods 27 and 27' respectively.

The press is then closed.

For this purpose, the moving part 22 abuts against the moving part 21 then the whole abuts against the stationary part 20, such movements being guided by any appropriate means, in particular by rods such as 31 linked to the stationary part 20 and engaging in the bores 33 and 34 provided in the moving parts 21 and 22.

Simultaneously, each bushing is driven into the bore 28 or 28' by the push rod 27 or 27' until it fits onto a stud 30 of the moving part 22, as illustrated in FIG. 3 in which the press is in the closed position. A plastics substance is injected and the cover is moulded in a known manner.

Then the press is opened and its various parts assume the positions illustrated in FIG. 4 so as to remove the moulded cover with its bushings, in this case two positive bushings and two negative bushings It is seen that in this position, the push rods 27 and 27' leave the ends of the branches 10 and 11 open so that one bushing falls by gravity into each bore 28 and 28'.

In each of the branches 10, 11, 8 and 9, the bushings come into contact by gravity with the bushing which is in the bore. Then, jack 32 pushes all the bushings into the compartments 3 and 4 so as to make them come into contact again with one another, while one bushing drops by gravity into the end of each compartment 3 and 4, the bushings leaving the compartments of the passage 13 from the supply tank 14 and so on.

It is seen that the operation of the apparatus is entirely automatic, it being necessary only to keep the hopper 14 supplied with bushings.

Further, in the case where hot bushings are to be inserted in a mould, the invention allows the bushings to be reheated while they are being conveyed.

Of course, the apparatus can, if need be, be used to insert any number of bushings in covers without thereby going beyond the scope of the invention.

Likewise, it can also be adapted to inserting parts of any shape and kind into moulded plastics structures.

Such variants which are obvious to the person skilled in the art cannot therefore be considered as being beyond the scope of the invention.

The invention is therefore not limited to the embodiment described and illustrated, but quite on the contrary covers all variants thereof.

What is claimed is:

1. Apparatus for automatically feeding bushings into a press for moulding covers for storage batteries wherein the apparatus includes a pipe for conveying the bushings, said pipe having at least one bushing-conveying compartment and being substantially horizontal inside the press, the or each of its compartments being subdivided into at least one descending branch each of which communicates with a bore provided in a first moving part of said press, push rods being linked to the stationary part of the press, which push rods can each be inserted in one of said bores during the translation movement of said moving part, studs being provided on a second moving part of the press and each being disposed adjacent to one of said bores so that firstly before moulding, when the press is closed by the translation movement of the two moving parts such that they abut against the stationary part of the press the push rods push a bushing into each bore until the bushing mates with the stud, and secondly, after moulding when the press is opened, another bushing drops by gravity into the bore at the end of said push rod.

2. Apparatus according to claim 1, wherein said compartments of the pipe are permanently fed with bushings in contact with one another.

3. Apparatus according to claim 1 or 2 including a feed pipe for feeding bushings to the compartments of said pipe for conveying the bushings.

4. Apparatus according to claim 1, 2 or 3 including means for pushing all of the bushings into the conveying pipe each time a bushing is placed in the press and each time the compartments of said feed pipe are fed with bushings.

5. Apparatus according to claim 4, wherein said means for pushing the bushing comprises a jack.

* * * * *